United States Patent [19]
Kawasaki

[11] 3,829,832

[45] Aug. 13, 1974

[54] SYSTEM FOR RECOGNIZING PATTERNS

[75] Inventor: Harumi Kawasaki, Tokyo, Japan

[73] Assignee: Asaki Kogaku Kogyo Kabushiki Kaisha, Tokyo-to, Japan

[22] Filed: Jan. 24, 1973

[21] Appl. No.: 326,259

[30] Foreign Application Priority Data

Jan. 27, 1972 Japan .............................. 47-10006

[52] U.S. Cl...... 340/146.3 P, 250/550, 340/146.3 F, 350/162 SF

[51] Int. Cl. ............................................ G06k 9/08

[58] Field of Search.......... 350/162 SF, 3.5; 356/71; 340/146.3 F, 146.3 P, 146.3 H, 146.3 AG; 250/550, 567

[56] References Cited

UNITED STATES PATENTS

| | | | |
|---|---|---|---|
| 3,234,511 | 2/1966 | Brust et al. | 340/146.3 H |
| 3,449,585 | 6/1969 | Trehub | 340/146.3 AG |
| 3,496,542 | 2/1970 | Rabinow | 340/146.3 AG |
| 3,519,331 | 7/1970 | Cutrona et al. | 350/162 SF |
| 3,550,084 | 12/1970 | Bigelow et al. | 350/162 SF |
| 3,566,137 | 2/1971 | Lemmond | 340/146.3 P |
| 3,597,045 | 8/1971 | Mathisen | 340/146.3 P |
| 3,600,054 | 8/1971 | Gabor | 340/146.3 P |

*Primary Examiner*—Raulfe B. Zache
*Assistant Examiner*—Leo H. Boudreau
*Attorney, Agent, or Firm*—Steinbert & Blake

[57] ABSTRACT

A system for recognizing patterns arranged in rows and columns with the rows forming elements of a given input group and the columns forming elements of a given input group so that there are a pair of input groups. Images of all of the elements of one of these input groups are simultaneously transmitted to a matched filter while the elements of the other input groups are sequentially transmitted to the matched filter. The matched filter produces in an output plane a plurality of sets of correlation pattern images corresponding to the number of elements of the group which has the images of its elements simultaneously transmitted, with the arrangement of the memorized patterns at the matched filter being such that the positions of the simultaneously transmitted images can be separated according to the location in the group of elements whose images are simultaneously transmitted. A photoelectric structure responds to the correlation images in the output plane for sending corresponding signals to a computer structure which identifies the patterns.

8 Claims, 14 Drawing Figures

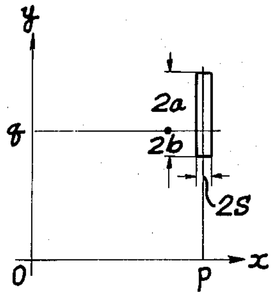
FIG. 2(a)
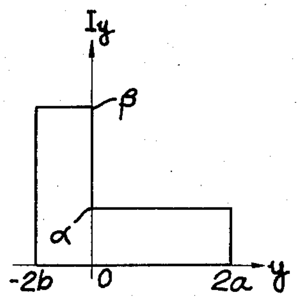
FIG. 2(b)
FIG. 3
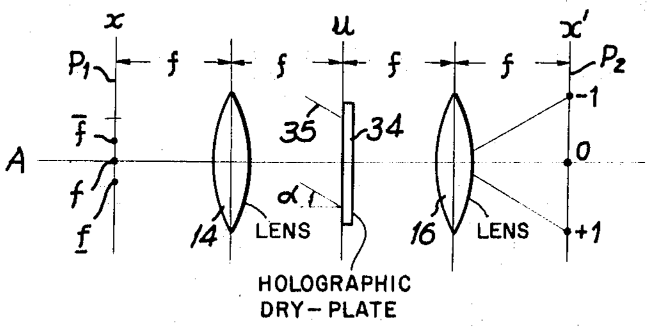
FIG. 4(b)
FIG. 4(a)
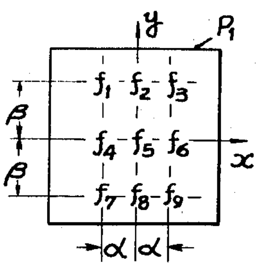
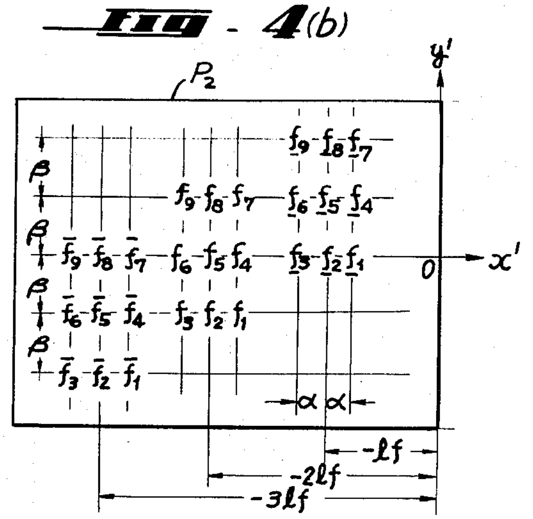

SYSTEM FOR RECOGNIZING PATTERNS

BACKGROUND OF THE INVENTION

The present invention relates to systems for recognizing patterns.

Thus, the present invention relates in particular to systems for recognizing two-dimensional patterns in the form of characters or the like carried by a suitable sheet.

One of the known systems for identifying or recognizing patterns such as characters is a conventional OCR (optical character reader). However, during recent times research has been carried out in connection with matched filtering techniques utilizing coherent light. The present invention relates to this latter type of pattern recognition.

The features of a conventional OCR include the following:

I. The characters which are to be read are normally in a standardized deformed condition, such as OCR–7, E 13, B, etc.

II. The functions which are performed by the optical system of the OCR are illumination, scanning, division, etc., of input characters, and in this case the optical system does not function directly to carry out computation with respect to two-dimensional patterns in response to optical information obtained from the input patterns.

III. Quantization and identification of the detected parameters of the input characters are all carried out by electronic computers.

IV. In general, this known apparatus is expensive and of a large size.

On the other hand, the features of matched filtering techniques are as follows:

1. The coherent optical system acts as a two-dimensional optical information processing circuit, so that the functions of identifying and memorizing characters are carried out optically instead of by way of electronic circuits as is the case with conventional OCR systems.

2. There is no particular restriction on the configurations of the input patterns.

3. However, since the optical identification is carried out by way of detection of correlation images (bright spot images), in contrast with a conventional OCR, there is the drawback of no redundancy and the identification discrimination ratio between mutually resembling characters is small.

In order to eliminate this latter drawback, generally use is made of code-transformation types of holograms by superposing certain optical codes on the matched filter.

SUMMARY OF THE INVENTION

It is a primary object of the present invention to improve pattern recognition with systems utilizing matched filter techniques.

One of the specific objects of the present invention is to improve the reading speed in such a way that it becomes possible to carry out simultaneous identification of a plurality of patterns.

Also it is an object of the present invention to provide an increase in the redundancy of the information which is treated so that it becomes possible to identify accurately a large number of different characters even in the case where some of the characters closely resemble each other.

Thus, it is an object of the present invention to provide a pattern recognizing system which is capable of operating automatically and rapidly to carry out accurately identification of a relatively large number of characters some of which may resemble each other relatively closely.

A further object of the present invention is to provide a pattern recognizing system which assures that the inputs are properly positioned so that there will be no overlapping of signals from a pair of adjoining patterns.

Also it is an object of the present invention to provide a system capable of normalizing the illumination of the patterns so that improper signals resulting from non-uniformity of the illumination of different patterns will not result.

According to the present invention there is provided a system for recognizing patterns which are arranged horizontally in rows and vertically in columns with all of these rows respectively forming elements of a given input group and all of the columns respectively forming elements of a given input group so that the rows of patterns and columns of patterns respectively form a pair of input groups. An image-transmitting means is provided for transmitting simultaneously all of the elements of one of these groups and sequentially the elements of the other groups. A matched filter means is positioned with respect to the image-transmitting means for receiving the images transmitted thereby, this matched filter means transmitting all of the patterns which are to be recognized to an output plane in multiplex form according to which a plurality of sets of all of the patterns are respectively arranged at different locations at the output plane with the number of these sets corresponding to the number of elements of the one group whose elements have their images simultaneously transmitted by the image-transmitting means. The matched filter means cooperates with the image-transmitting means for separating the simultaneously transmitted images of the one input group of patterns respectively among the several sets according to the location of the elements of this one input group in the latter, while simultaneously providing for each pattern a corresponding memorized pattern image, so that the matched filter means will respond simultaneously to all of the elements of the one input group and sequentially to the elements of the other input group. A photosensitive means is situated at the output plane for receiving therefrom signals in response to correlation images occurring simultaneously at the sets of images in the output planes from all of the elements of the one input group during image-transmission by the image-transmitting means of one of the elements of the other input group. This photosensitive means simultaneously transmits signals from all of the sets of correlation images indicating which element of each set matches a given pattern. An identifying-circuit means is electrically connected with the photosensitive means for identifying the signals transmitted thereby so as to be capable of simultaneously reading all of the elements of the one input pattern group while successively identifying the elements of the other pattern group.

BRIEF DESCRIPTION OF DRAWINGS

The invention is illustrated by way of example in the accompanying drawings which form part of this application and in which:

FIG. 1(*b*) is an example of the types of images which are initially formed with respect to one of a pair of perpendicular coordinates;

FIG. 1(*c*) is a diagrammatic representation of the images resulting from further optical treatment of the images shown in FIG. 1 (*b*);

FIG. 1(*d*) is a diagrammatic representation of a further form which the images take during treatment thereof subsequent to the condition illustrated in FIG. 1(*c*);

FIG. 1(*e*) is a diagrammatic illustration of the arrangement of slits in a shield used in connection with an optical system pertaining to one of a pair of mutually perpendicular coordinates;

FIG. 2(*a*) illustrates graphically characteristics of an input pattern with respect to one of the mutually perpendicular coordinates;

FIG. 2(*b*) graphically illustrates intensity of light in connection with a pattern;

FIG. 3 is a diagrammatic illustration of the manner in which a matched filter is obtained for use in the invention as well as an illustration of the manner in which the matched filter is used;

FIG. 4(*a*) is a diagrammatic representation of a set of input patterns;

FIG. 4(*b*) schematically represents the manner in which self-correlation images may be located at an output plane of the optical system of the invention;

FIG. 6(*b*) shows further details of the structure of FIG. 6(*a*) in connection with circuitry for providing positioning signals and illumination-standardizing signals.

DESCRIPTION OF PREFERRED EMBODIMENTS

Figures 1A, 1B, 1C, 1D, 1E:
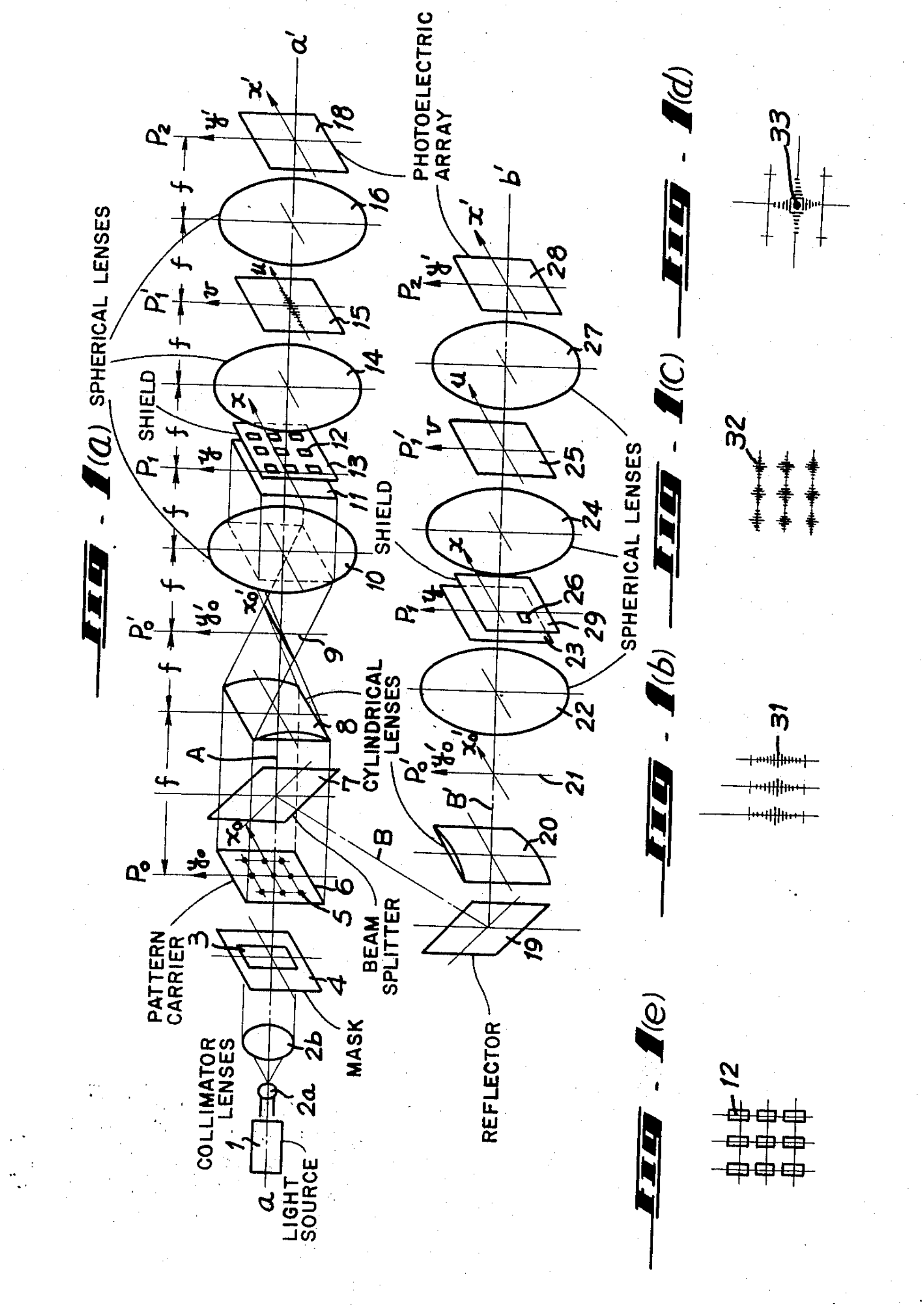
FIG. 1(*a*) schematically illustrates in a diagrammatic manner one possible example of the optical structure of a pattern recognizing system according to the present invention.

Referring to FIG. 1(*a*), there is illustrated therein one example of an optical system according to the present invention. Light rays which issue from a coherent light source 1 are transformed by collimator lenses 2*a* and 2*b* into an enlarged pencil of parallel light rays which travel through an elongated vertically extending mask opening 3 of a mask plate 4 so as to have the form of a pencil of parallel light rays situated within an area which is of a rectangular configuration. These light rays which thus travel along the optical axis *a*, *a'* reach a carrier 6 which carries patterns 5 which are to be recognized. It is assumed in the illustrated example that the plurality of patterns 5 are made up of nine patterns arranged in three horizontal rows and three vertical columns. Thus, in the illustrated example the carrier 6 forms a memory medium in which the patterns 5 are stored. The patterns may be letters of the alphabet, numerals, Chinese characters, Kana characters (Japanese syllabary), punctuation marks, symbols, or any arbitrary figures. Furthermore, it is assumed that the carrier 6 is in the form of a negative transparency carrying positive patterns on a dark background as is the case with negative exposures of photographic film. In the particular example illustrated in FIG. 1(*a*) the mask slit 3 is positioned with respect to the carrier 6 in such a way that light will pass only through the central column of patterns arranged along the $y_o$-axis.

This light which thus passes through the central column of patterns in the illustrated example is split into a pair of beams by a semi-transparent reflector or mirror 7, so that the light A continues to travel along the optical axis *a*, *a'* through the beam splitter 7 while reflected light B travels toward the reflector 19. This optical structure of the invention forms an image-transmitting means for transmitting images of the patterns 5, and the image-transmitting means has a pair of optical systems for respectively receiving image characteristics with respect to a pair of mutually perpendicular coordinates. The light A which travels through the semi-transparent reflector 7 is received by a Y-image optical system for detecting pattern characteristics with respect to the Y or vertical axis, while the reflected light B is further reflected by the mirror 19 to travel along the optical axis B', *b'* along which are located components of an optical system for detecting X-image optical characteristics, or in other words, characteristics of the image patterns with respect to a horizontal or *x*-axis. These two systems, namely the Y-image optical system utilizing the light A and the X-image optical system using the light B are each made up of entirely the same elements and have entirely the same dimensions, the only difference being that the systems have cylindrical lenses 8 and 20 which are arranged perpendicularly one with respect to the other. Therefore, the greater part of the following description is made with respect to the Y-image optical system utilizing the light A which continues to travel along the optical axis *a*, *a'*.

The cylindrical lens 8 of the Y-image optical system is arranged so that its axis extends horizontally, parallel to the $x_o$ axis of the plane in which the carrier 6 of the input patterns is located. This cylindrical lens 8 and the succeeding three spherical lenses 10, 14, and 16 all have equal focal lengths *f*. The distance from each one of these lenses to the next lens is 2*f*. The several lenses 8, 10, 14 and 16, respectively have focal planes $P_0'$, $P_1$, $P_1'$ and $P_2$, with these latter planes respectively having mutually perpendicular coordinates ($x_o'$, $y_o'$), (*x*,*y*), (*u*,*v*) and (*x'*, *y'*). The memory medium or pattern carrier 6 is positioned at the front focal plane of the cylindrical lens 8. From the patterns 5 the image-transmitting means will provide at the plane $P_o'$ images 31 as schematically shown in FIG. 1(*b*), assuming that the mask 4 is not used. These images are formed and extend in the $y_o'$ direction and it will be observed that a Fourier image of the patterns of the rows are placed one upon the other, while there is no image which is formed in the direction of the $x_o'$ axis. The image 32 which is schematically represented in FIG. 1(*c*) is the image at the plane $P_1$ where as a result of the treatment of the image 31 by the lens 10 there results at the plane $P_1$ the image 32 which is a compression image in the *y*-axis direction of each pattern (referred to as the Y-image of the pattern), and in addition it is observed that there is a Fourier image in the *x*-axis direction of each pattern.

Since the pattern information desired in the Y-image optical system is the Y-image of the pattern, the Fourier images in the $x$-axis direction must be removed. For this purpose, at the plane $P_1$, there is placed a shield plate 13 having nine vertically extending slits 12 arranged in rows and columns in the same way as the input patterns 5, and this arrangement of the slits 12 of the shield 13 is illustrated in FIG. 1($e$). The width of each of these slits is great enough to permit the Y-image of each pattern to pass through while the height of each slit is equal to the greatest height encountered with the particular group of input patterns which are to be recognized, and the arrangement is such that there is no overlap between the patterns of the several rows. In this manner the light which passes through the slits 12 of the plate 13 transmit information pertaining only to characteristics of Y-images of the input patterns, and it is thus possible, as a result of the action of the cylindrical lens 8, to provide a multiplex representation of patterns of several channels in the $x_o$ direction. These Y-image patterns thus have an elongated, vertically extending slit-shaped configuration with the distribution of light intensity of the light which passes therethrough resulting from the projection of the patterns on the $y_o$-axis. This light distribution will vary with the different patterns.

These Y-images, arranged in three horizontal rows and three vertical columns according to the illustrated example, are treated as new input patterns and the light filtering operations are carried out with that part of the optical system which includes the shield plate 13, the lens 14, the Fourier plane 15, coinciding with the plane $P_1'$, the lens 16, and the output plane $P_2$ where a part 18 of a photosensitive means of the invention is situated as described in greater detail below.

The Fourier images 33 of the nine Y-images at the Fourier plane $P_1'$, see FIG. 1($d$), are placed one upon the other and have a phase term or characteristic depending upon the position of the Y-image of each pattern, this phase term being added to the Fourier spectrum of each Y-image.

For example, the Fourier image $F(u,v)$ of Y-image $f(x, y)$ is illustrated in FIGS. 2($a$) and 2($b$), and is obtained as follows:

$$f(x, y) = \mathrm{rect}(x-p/2s)[\beta\mathrm{rect}(y-q+b/2b) + \alpha\mathrm{rect}(y-q-a/2a)]$$

where if $$\begin{cases} \mathrm{rect}\,(x) \equiv 1, & |x| \leq \frac{1}{2} \\ \quad\quad\;\; \equiv 0 & |x| > \frac{1}{2} \end{cases}$$

$F(u, v) = 2s\cdot\mathrm{sinc}(2su)\cdot 2b\beta\mathrm{sinc}(2bv)\cdot\exp[-ir_0\{up + v(q-b)\}] + 2s \cdot \mathrm{sinc}(2su) \cdot 2a\alpha\,\mathrm{sinc}(2av)\cdot\exp[-ir_0\{up+v(q+a)\}]$ where $\mathrm{sinc}(x) \equiv \sin x/x$, $r_0$ is a constant.

Thus $F(u,v)$ is divided by the relative intensities $\alpha$ and $\beta$ of the Y-image, and both of these are distributed along the $u$ and $v$ axes with the origin at the central position. Thus, there is a phase angle which is proportional to the position of the Y-image at the input plane.

FIGS. 2($a$) and 2($b$) illustrate one example of a Y-image of the input pattern, indicating its configuration, coordinates and the distribution of the light passing through the pattern. The coordinates $x$ and $y$ which appear in FIG. 2($a$) are the same as the corresponding coordinates at the plane $P_1$ in FIG. 1($a$) where the shield 13 is located to permit light to travel through the slits 12 beyond the image plane 11 which is situated along the optical axis $a$, $a'$ subsequent to the lens 10. Thus, at this plane $P_1$ which has the coordinates illustrated in FIG. 2($a$) there is illustrated by way of example a pattern of rectangular configuration having the center coordinates $p$, $q$, this pattern having a width $2s$ with the pattern having a length below the intersection of the center coordinates $p$, $q$, equal to 2$b$ and above this intersection equal to 2$a$.

FIG. 2($b$) illustrates the $y$ coordinate at the abscissa while the ordinate is formed by the light intensity $I_y$. The intersection of the abscissa and ordinate of the graph of FIG. 2($b$) corresponds to the intersection of the center coordinates $p$ and $q$ of the pattern of FIG. 2($a$), and thus it will be seen that along the abscissa $y$ of FIG. 2($b$), the dimension below the center is illustrated at $-$2$b$ and above the center is illustrated at 2$a$. Thus, the intensity of the light passing through is indicated at $\alpha$ for the light which passes above the center of the pattern of FIG. 2($a$) and at $\beta$ for the light which passes through the pattern of FIG. 2($a$) below the center of the pattern of FIG. 2($a$) formed by the intersection of the coordinate $p$, $q$. Thus, FIGS. 2($b$) illustrates the non-uniformity in the distribution of light which passes through a given pattern.

Referring now to FIG. 3, there is illustrated therein the manner in which a matched filter means according to the present invention is manufactured so as to perform light filtering and memory functions. In FIG. 3 the elements which correspond to FIG. 1($a$) are designated by the same reference characters.

In order to make the matched filter means of the invention, there is situated at the plane $P_1$ Y-images $f_{rs}(x, y)$ of 4RS patterns arranged on 2R rows and 2S columns with column spacing $\alpha$ and row spacing $\beta$. This is to be regarded as a new input pattern group, as pointed out above in connection with the shield 13, and illumination is made by parallel light rays. A holographic dry-plate 34 is situated at the focus of the lens 14, and this dry-plate 34 is exposed to parallel reference light rays 35. The matched filter is obtained by developing this hologram dry-plate with $\gamma = 2$.

With input patterns of $\mu$ rows and $\nu$ columns $f\ (x-\alpha\mu, y-\beta\nu)$ and parallel reference light rays (35) $\exp(ik\nu l\, u)$, the matched filter owing to pattern group $$\sum_\mu \sum_\nu f_{\mu\nu}(x-\alpha\mu,\ y-\beta\nu) \text{ is:}$$

$$\sum_\mu \sum_\nu F^*_{\mu\nu}(u, v) \exp\,[ip\{(\mu\alpha + \nu lf)u + \nu\beta v\}] \tag{1}$$

where $k = 2\pi/\lambda$, $\lambda$ is the wavelength of the coherent light; $l$ is the direction cosine of the reference light, $l = \sin\alpha$(see FIG. 3); $P = k/f$, $f$ is the focal length of the lens; * indicates conjugate complex number.

The direction of incidence of the reference light 35 is varied in accordance with the particular row of the group of patterns which is subsequently to be identified, as will be apparent from the description which follows. For the $\nu$-th row the direction cosine $\nu\, l$ is introduced and the hologram dry-plate 34 is exposed to light with patterns other than those of the $\nu$-th row covered, and the several rows are each exposed in this way to reference light having a particular angle of incidence so as to provide multiplex exposure in a sequential manner, as will be apparent from the description below. In this case $\mu=0, \pm1, \pm2, \ldots, \pm R;\ \nu=0, \pm1, \pm2, \ldots, \pm S$.

The process of light filtering is as follows:

The input patterns which are arranged in rows and columns as set forth above is placed at the plane $P_1$, the reference light 35 is removed, and the matched filter means of the invention is situated at the plane $P_1'$, which it will be noted is the same plane in which the matched filter means 34 was located during the introduction into the latter of the image patterns memorized thereby. The focal plane $P_2$ of the lens 16 is the output plane where an array 18 of photoelectric elements is situated in a manner described also in greater detail below. In this output plane $P_2$ and in the direction of diffraction light of −1st order (at the distance of $f\nu l$ from the optical axis, there appears the correlation image of the input pattern $f\mu\nu$ and the matched filter.

Resulting from the fact that the slit 3 of the mask 4 of FIG. 1($a$) extends vertically so as to simultaneously transmit all of the patterns in a given column while only one of the patterns in each row, only input patterns of the 0-th column are applied as inputs, so that the input pattern of the 0-th column and $t$-th row is represented by $f_{ot}(x, y-t\beta)$. If this same pattern is at the $r$-th row and $s$-th column during making of the matched filter means, then the matched filter [function (1)] is rewritten as follows:

$$F^*_{ot}(u, v)\exp[ip\{r\alpha + sfl)u + \beta sv\}] + \sum_{\mu \neq y}\sum_{\nu \neq s} F^*_{\mu\nu}(u, v)\exp[ip\{(\mu\alpha + \nu fl)u + v\nu\beta\}] \quad (2)$$

The result of inverse Fourier transformation of the product of this matched filter and the Fourier image of the input pattern $F_{ot}(u, v)\exp[-ipt\beta v]$ is the correlation. This correlation $\rho$ is divided into the self correlation $\rho_{oo}$ of the pattern $f_{ot}$ and the mutual correlation $\rho_{ot,\ \mu\ \nu}$ between $f_{ot}$ and other memory pattern. Thus, the result is:

$$\rho = \rho_{00}[x' + r\alpha + slf,\ y' + (s-t)\beta] + \sum_{\mu}\sum_{\nu} \rho ot,\ \mu\nu[x' + \mu\alpha + \nu fl,\ y' + (\nu - t)\beta] \quad (3)$$

The position of the bright spot of self crrelation is: $x' = -(r\alpha + sfl)$, $y' = (t-s)\beta$. From the equation (3) it is clear that the positions of $\rho_{oo}$ and $\rho_{ot,\ \mu\ \nu}$ are not placed one upon the other. In FIG. 3, 0, +1, −1 are positions of diffraction light images of 0-th, +1st and −1st order, respectively.

Generally, a self-correlation bright spot has a sharp light intensity peak at the center of a glow, while a mutual correlation image is a wider blurred image so that these are clearly distinguished.

FIG. 4($b$) illustrates an example of the locations of these self-correlation images at the output plane $P_2$ where the array 18 is located, with respect to nine patterns $f_1, f_2 \ldots f_9$. FIG. 4($a$) illustrates the arrangement of the input patterns situated at the plane $P_1$ during making of the matched filter means in the manner described above in connection with FIG. 3. Thus it will be seen that in the illustrated example there are nine input patterns arranged in such a way that the three columns are spaced from each other by the distance $\alpha$ and the three rows are spaced from each other by the distance $\beta$.

In FIG. 4($b$), $\overline{f_j}$, $f_j$ and $\underline{f_j}$ indicate that the input pattern $f_j$ has appeared at the upper, middle and lower row, respectively. Thus, with respect to $f_j$, $j$ is considered to equal 1, 2, ...,9, while at the several correlation images in FIG. 4($b$) the symbol — over $f_j$ indicates that the symbol occurs in the upper row, the lack of any such symbol indicates that the symbol occurs in the middle row, while the symbol line — beneath the pattern indicates that this pattern occurs in the lower row. Along the bottom part of FIG. 4($b$), there are indicated the focal length $f$ of the lens and the direction cosine 1. Thus, it will be seen that the latter factors are equal to $-lf$ for the lower row, $-2\ lf$ for the center row and $-3\ lf$ for the upper row.

In other words, when the matched filter means 34 is manufactured, all of the symbols of the rows at the input pattern shown in FIG. 4 ($a$) are stored in the matched filter means with the rows respectively having different angles of incidence for the parallel reference light rays 35 in order to achieve in the output plane one set of input image patterns for the upper row, as shown at the lower left part of FIG. 4($b$), a second set to be detected in connection with the middle row and appearing at the central portion of FIG. 4($b$), and of course in the illustrated example where there are three rows the set of possible input image patterns which may be encountered in the lower row is provided as illustrated in the upper right portion of the output plane shown in FIG. 4($b$). Thus, what FIG. 4($b$) shows is all possible examples of correlation images which may be encountered at the output plane $P_2$.

In other words, if the incidence angle of the parallel light rays were the same for identification in each row, then the three sets of correlation images shown in FIG. 4($b$) would become situated one upon the other. However, by changing the incidence angle of the reference light with the particular row, the positions of the self-correlation images can be completely separated from each other with respect to each row in each column.

Thus, as was indicated above, in the particular example illustrated, the masking slit 3 extends vertically so that all of the elements of a selected column are transmitted simultaneously with these elements being situated in different rows. If any one of the nine patterns which form the total number in the illustrated example occurs in the top row of a given column, then it will provide a correlation image shown at the lower left of FIG. 4($b$) corresponding to the particular pattern, and of course the same is true for the remaining rows which will provide corresponding correlation images. Assume, for example, that the pattern $f_7$ occurs in a particular column at the top and bottom rows while the pattern $f_5$ occurs at the middle row, then with such an example the correlation images $\overline{f_7}$ and $\underline{f_7}$ will be provided while the correlation image $f_5$ at the center set of input patterns will be produced.

In order to transmit signals in accordance with the correlation images which are present at the output plane $P_2$ a photosensitive means is provided, and this photosensitive means includes the array 18 of photoelectric elements which is provided with a number of photoelectric elements situated at the plane $P_2$ and corresponding to the number of patterns shown at FIG. 4(*b*) arranged as illustrated at FIG. 4(*b*) so as to respond whenever a correlation image occurs in order to transmit a corresponding signal. Thus, there is a photoelectric element of the array 18 at each of the self-correlation image positions of FIG. 4(*b*). These signals which are thus received by the array of photoelectric elements are amplified and transformed into differentiated positive pulses by electrical circuitry similar to that described below in connection with FIG. 6(*b*), so that in the case of FIG. 4(*b*) it is possible to provide 9 × 3 = 27 different information signals.

The above description has been with respect to the Y-image optical system. With respect to the X-image optical system, this system includes the cylindrical lens 20 shown in FIG. 1(*a*). The cylindrical lens 20 has its axis extending parallel to the $y_o$-axis. The optical system includes the cylindrical lens 20 and the succeeding elements arranged along the axis P′, *p*′ which respectively correspond to and are identical with the elements arranged along the Y-image optical system, turned by 90° with respect to the optical axis. The lenses 22, 24, and 27, respectively correspond to the lenses 10, 14 and 16. The slit 26 is one of a plurality of slits corresponding to the slits 12 and arranged in a shield 29 situated immediately after the image plane 23 which corresponds to the image plane 11. The photoelectric element array 28 corresponds to the photoelectric element array 18. In both the X-image and Y-image optical systems, the input pattern at the plane $P_0$ and the image at the plane $P_1$ are in mutually inverted relation.

Figure 5:
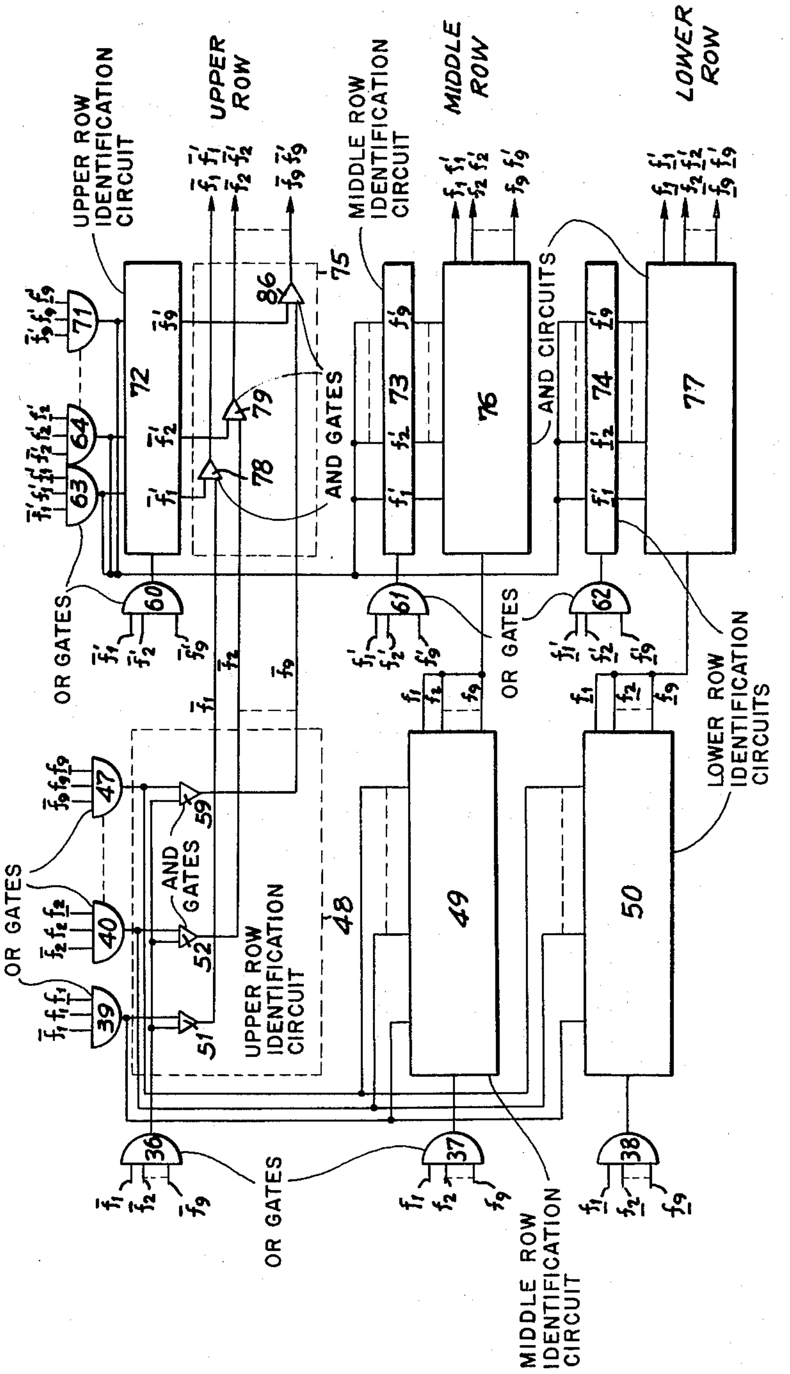
FIG. 5 is a schematic wiring diagram illustrating the computer circuitry used for identifying signals and thus patterns.

By way of the above circuitry the photosensitive means formed by the photoelectric arrays 18 and 28 transmit signals to the identifying-circuit means which is illustrated in FIG. 5, this circuit means being capable of detecting the the signals of the self-correlation images at the output planes $P_2$ of both optical systems and being capable of carrying out simultaneous pattern identification for three rows in a single column at the input plane $P_0$.

Referring to FIG. 5, the circuit structure 36–59 is provided for identifying the self-correlation patterns at the output plane where the array 18 is located while the circuit structure 60–86 will identify the self-correlation images appearing at the output plane where the array 28 is located, or in other words the self-correlation images at the output plane of the X-optical system. The positive pulses of the corrlation images are indicated for the Y-images by the $\overline{f_i}$, $f_i$, and $\underline{f_i}$ where $i = 1, 2, \ldots 9$, while in the case of the X-images the positive pulses are indicated in FIG. 5 by $\overline{f'_i}$, $f'_i$, $\underline{f'_i}$, where $i = 1, 2, \ldots 9$.

Each of the OR gates or circuits 36, 37, and 38 has nine inputs. These OR gates produce an output "1" when the input pattern is respectively at the upper, middle, or lower row. In other words, any upper row correlation image will provide a response at the circuit 36, any middle row correlation image will provide a response at the circuit 37, and any lower row correlation image will provide a response at the circuit 38. This circuitry includes also nine OR gates or circuits 39, 40, . . . , 47 each of which receives any one of three possible inputs, each of the three inputs corresponding to a single pattern, and irrespective of the row in which the particular pattern is located a signal will be transmitted to a corresponding one of the OR gates 39–47.

This identification-circuit means includes an upper row identification circuit 48, a middle row identification circuit 49, and a lower row identification circuit 50. The upper row identification circuit 48 carries out identification of the input patterns which occur in the upper row and produces identification outputs $\overline{f_1}, \overline{f_2}, \ldots, \overline{f_9}$. Thus, the identification circuit 48 includes a series of AND gates or circuits 51–59 respectively connected electrically with the OR gates 39–47 and all connected with the OR gate 36. Thus, all of the AND gates 51–59 will receive a signal from the OR gate 36, and depending upon which of the AND gates 51–59 receives a signal from one of the OR gates 39–47, a corresponding identification signal will be provided.

In the very same way the middle row identification circuit 49 has a series of AND gates all connected to the OR gate 37 and respectively connected with the OR gates 39–47, so that whenever a middle row pattern has a correlation image at the output plane the OR gate 37 will respond and one of the OR gates 39–47 will respond to provide a corresponding output identification signal from the identification circuit 49.

The lower row identification circuit 50 has all of its AND gates connected with the OR gate 38 and respectively connected also with the OR gates 39–47, so that corresponding identification signals will be provided when a correlation image occurs at a lower row.

The processing of the X-image correlation signals takes place at the elements 60–74 in the same way as described above for the Y-image correlation signals with the elements 36–50. Thus, the OR gates or circuits 60, 61 and 62 respectively correspond to the OR gates 36–38. The OR gates or circuits 63, 64, . . . 71 respectively correspond to the OR circuits 39, 40 . . . 47, and the upper middle and lower row identification circuits 72, 73 and 74 respectively correspond to the identification circuits 48, 49, and 50.

The outputs $\overline{f_1}, \overline{f_2}, \ldots, \overline{f_9}$ of the Y-image upper row identification circuit 48 and the outputs $\overline{f'_1}, \overline{f'_2}, \ldots, \overline{f'_9}$ of the X-image upper row identification circuit 72 are applied as inputs to a series of AND circuits 78, 79, . . . , 86 for corresponding patterns, and from the latter AND gates there are provided corresponding final identification outputs for the upper row $\overline{f_1}\overline{f'_1}, \overline{f_2}\overline{f'_2} \ldots, \overline{f_9}\overline{f'_9}$. In the same way identification is carried out for the input patterns of the middle and lower rows by the AND circuits 76 and 77.

Thus, arbitrary input patterns are recognized simultaneously for a plurality of rows as AND products of the self-correlation outputs of the X-image and Y-image light filterings. In other words all of the horizontal rows of input patterns form elements of one input group while all of the vertical columns of input patterns form elements of a second input group. All of the elements of one of the latter groups are simultaneously acted upon by the image-transmitting means of the invention to have all of the images thereof simultaneously transmitted to the matched filter means while only one of the elements of the other input group is transmitted. In the illustrated example since the mask slit 3 extends vertically, only one column is acted upon at a time, but all of the rows in each column are treated simultaneously, so that the rows in the illustrated example form the elements of the input group which are simultaneously acted upon while the columns form the elements of the input group which are sequentially acted upon. Naturally, it is possible to provide a different arrangement according to which only a single row would be transmitted at one time while all of the elements of the several columns in the one row are simultaneously transmitted. This would require only a horizontal slit 3 rather than a vertical slit 3.

If, in contrast with the present invention, correlation image output identification were to be carried out by means of the light filtering of the input patterns themselves, then it would be difficult to carry out discrimination between characters which have mutually resembling Fourier images, such as the alphabet letters (O, Q, C, G), (P, R), etc.

However, the double simultaneous correlation system of input patterns according to the present invention gives redundancy to the information and remarkably increases the discrimination ratio for identification. In other words, because with the system of the present invention there is a simultaneous detection both of pattern characteristics along the X-axis and pattern characteristics along the Y-axis, it is possible to discriminate very effectively even between input patterns which closely resemble each other.

In connection with detection of correlation images as described above, the factors of the positioning of the input characters or patterns and the standardization of the self-correlation output intensity should be taken into consideration.

With respect to the positioning of the input patterns or characters, it should be noted that, as is clear from the formula of correlation images (the equation 3), the position of the self-correlation image is the function of the position of the input pattern or character. Accordingly positioning of the input patterns should be carried out photoelectrically. In order to be able to carry out fluent reading of input patterns, the correlation image read instructions must be made at the instant when two neighboring or adjoining patterns do not partly overlap each other.

As for the standardization of the self-correlation output intensity, the passing-through light of a given input pattern, and accordingly the light intensity of the self-correlation images, varies with the different patterns. For this reason it is possible that sometimes the mutual correlation output of one pattern and another pattern is greater than the self-correlation output of the pattern (generally $\rho_{oo} > \rho_{ot}, \mu \quad \nu$ ). Therefore, both when making the matched filter and during actual identification, the self-correlation output of each pattern should be standardized in connection with the intensity of the light passing through the pattern.

Figures 6A, 6B:
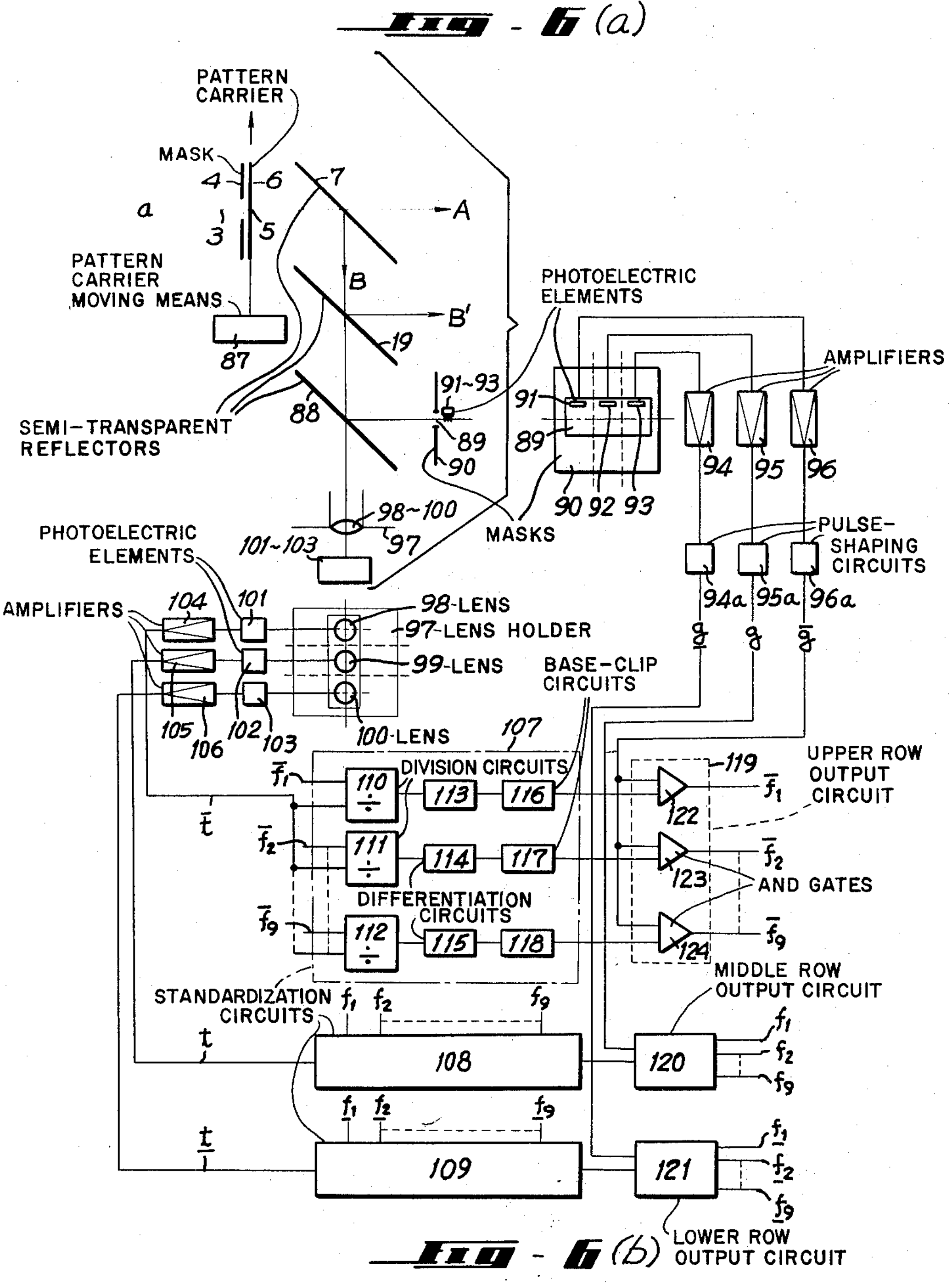
FIG. 6(*a*) is a schematic illustration of part of the optical system of FIG. 1(*a*) showing an addition to the system utilized for positioning and illumination-standardizing purposes.

The above factors of positioning of the input characters and standardization of the self-correlation output intensity are treated with the circuitry illustrated in FIGS. 6 ($a$) and 6 ($b$), which illustrate structure and circuitry to be combined with the structure and circuitry of FIGS. 1 ($a$) and 5.

Thus, FIG. 6 ($a$) schematically illustrates the mask plate 4 with the mask slit 3 formed therein and situated along the optical axis $a$, A, FIG. 6 ($a$) also showing the information carrier 6 which carries the input patterns 5 electrically connected with a structure 87 for sequentially moving the successive columns into alignment with the mask slit 3. FIG. 6 ($a$) also illustrates the semi-transparent reflector 7 and the semi-transparent reflector 19 which are shown in FIG. 1 ($a$). The light which passes through this reflector 19 is received by an additional semi-transparent reflector 88. Thus, this reflector 88 of FIG. 6 ($a$) is to be considered as situated in the manner shown in FIG. 6 ($a$) with respect to the reflector 19 which is shown in FIG. 1 ($a$). Thus, the light which passes through the reflector 7 and which is reflected by the reflector 19 of FIG. 6 ($a$) respectively travel along the Y-image optical system and X-image optical system as described above.

The light which thus travels through the reflector 19 is split by the semi-transparent reflector 88 so that in this way the light reflected by the reflector 88 may be used for positioning of the input pattern while the light which passes through the reflector 88 may be used for standardization of the correlation output.

This light which travels through the reflector 88 is received by three small lenses 98, 99, 100 carried by a lens holder 97 at locations corresponding to the locations of the upper, middle, and lower rows of the input pattern, respectively. At the foci of the small lenses 98, 99, and 100 there are photoelectric elements 101, 102, and 103, respectively, this structure being clearly illustrated in FIG. 6 ($b$). Thus, the light which passes through the particular column of input patterns which thus has patterns in each row is photoelectrically detected and is then amplified by the corresponding amplifiers 104, 105, and 106, so that these amplifiers will provide outputs $\bar{t}$ for the upper row, $t$ for the middle row, and $\bar{t}$ for the lower row. It is to be noted that this means for standardizing the light intensity of the several input patterns is also utilized when the matched filter means is manufactured, only at this time there are three additional small lenses for each of the additional columns, so that six small lenses are added to those shown in FIG. 6 ($b$), and use is made of nine photoelectric elements and nine amplifiers. The amount of light exposure or the light exposure time are controlled in accordance with these photoelectrically detected signals which form the outputs of the amplifiers, so that in this way it is possible to normalize the spectrum of each input pattern which is to be memorized in the matched filter means of the invention.

While the standardization circuit described below is an example only for the Y-image of the pattern, the same circuitry is used in connection with the X-image. The outputs $\bar{t}$, $t$ and $\underline{t}$ are respectively applied as inputs to upper, middle and lower row standardization circuits 107, 108, and 109, respectively.

The operation of standardization is described below in connection with the upper row standardization circuit 107.

Considering the photoelectric array 18 of FIG. 1 ($a$), any of the self-correlation outputs $\overline{f_1}, \overline{f_2}, \ldots, \overline{f_9}$, corresponding to upper row correlation images as shown at the lower left portion of FIG. 4 ($b$) are applied as inputs to the respective division circuits 110, 111, . . . , 112, as indicated in FIG. 6 (*b*). As a result these division circuits will have standardization outputs $\overline{f_1/t}$, $\overline{f_2/t}$, . . . , $\overline{f_9/t}$. In this case the upper row input pattern is occupied by one of the patterns $f_1, f_2, \ldots, f_9$, so that these outputs are exclusive.

These standardized self-correlation outputs are differentiated by respective differentiation circuits 113, 114, . . . , 115 and are then shaped by respective base-clip circuits 116, 117, . . . , 118 into positive pulses of equal pulse height. The self-correlation image has an intensity peak at the center and a surrounding glow. The effect of the above differentiation is to extract the central peak value as a characteristic and to avoid wider indefinite pulses (d.c.-like outputs).

In the same way correlation images from the set corresponding to the middle row provide from the array of photoelectric elements 18 signals transmitted to the circuit 108 to be divided by the signal $t$ in order to achieve in this case also standardized outputs as described above in connection with circuit 107, and the same operations take place at the circuit 109 with respect to lower row correlation images and the output $\underline{t}$ from the amplifier 106.

Considering now the light reflected by the semitransparent reflector 88, this light is directed through a mask opening 89 formed in a mask plate 90, this mask opening having the same shape and size as the mask slit 3. Immediately behind the opening 89 is situated the set of photoelectric elements 91–93. The arrangement of the mask opening 89 in the plate 90 and the photoelectric elements 91–93 is clearly shown in FIG. 6 (*b*). These photoelectric elements 91–93 have a narrow width and are arranged laterally with respect to, or at the side of the direction of travel of, the input patterns. The photoelectric elements 91, 92 and 93 serve to position the input patterns of the upper, middle and lower rows, respectively. When the light of these patterns, which are applied as inputs in sequence, falls on these photoelectric elements, 91–93, the outputs of the latter are amplified by the amplifiers 94–96, respectively, and then the corresponding outputs are differentiated by pulse-shaping circuits 94*a*, 95*a* and 96*a*. Thus, there are produced output pulses which form upper, middle, and lower row pattern positioning pulses $\bar{g}$, $g$, $\underline{g}$. In order to detect the above standardized self-correlation outputs at the exact instant when the pulses $\underline{g}$, $g$, $\bar{g}$ are produced, and thus reliably avoid any possible overlapping of signals, upper, middle, and lower row and circuits 119, 120, and 121 are respectively provided. Thus, the upper row circuit 119 includes the AND gates 122, 123, 124 all of which simultaneously receive the upper row positioning pulse $\bar{g}$ and which respectively receive signals from the circuit 107. In other words in the illustrated example there are nine AND gates 122, 123, . . . , 124 respectively receiving signals from the nine base-clip circuits 116, 117, . . . , 118 depending upon which correlation image occurs at the upper row set in the output plane shown in FIG. 4 (*b*), so that at one of the AND gates 122, 123, . . . 124 there will be simultaneously a signal from the circuit 107 and a position pulse signal $\bar{g}$, and from the particular AND gate which simultaneously receives both of these signals there will be one of the outputs $\bar{f}_1, \bar{f}_2, \ldots, \bar{f}_9$, as indicated in FIG. 6 (*b*). In the same way the circuit 120 has nine AND gates cooperating with the nine standardizing circuits of the circuitry 108, and the circuit 121 includes nine AND gates electrically connected with the several circuits of the circuitry 109, thus achieving the output signals indicated in FIG. 6 (*b*). Therefore, the middle and lower row AND circuits 120 and 121 function in the very same way to provide normalized and properly positioned pulse series $f_1, f_2, \ldots, f_9$, and $\underline{f}_1, \underline{f}_2, \ldots, \underline{f}_9$, while the circuit 119 provides the upper row pulse series $\bar{f}_1, \bar{f}_2, \ldots, \bar{f}_9$. These output signals are then transmitted to the identifying-circuit means of FIG. 5 described above. Since the above-described structure relates only to the Y-image system, these signals which form the output of the circuitry of FIG. 6 (*b*) are received by the OR gates 36–38 and 39–47, but of course in connection with the X-image system the same results are achieved. In other words the output from the array 28 of photoelectric elements forms inputs to a plurality of standardizing circuits identical with the circuits 107, 108, 109, and the outputs of the latter are transmitted to AND circuits corresponding to the circuits 119, 120, and 121, so that in this way the input signals $\overline{f_1'}, \overline{f_2'}, \ldots, \overline{f_9'}$ are provided to be transmitted to the OR gates 60–62 and 63–71 of FIG. 5 as described above.

As is apparent from the above description, the following features and advantages are achieved with the present invention:

I. The light which passes through the input patterns is divided and transmitted into the pair of mutually perpendicular cylindrical lenses so as to provide two passing-through light intensity distributions in directions which are right angles to each other for the X-image and Y-image patterns, and separate light filtering operations are carried out with each of these light distributions. In this manner, as contrasted with simple filtering according to conventional techniques, the redundancy of the pattern signals is increased and the discrimination ratio of patterns which resemble each other is also increased.

II. A plurality of patterns are memorized at the matrix or matched filter means of the invention, so that the matched filter means has a two-dimensional arrangement corresponding to the arrangement of input patterns. In this way the light filtering according to the present invention achieves a purely optical memory function as contrasted with the CPU memory function utilized with a conventional OCR.

III. A further feature of the matched filter means of the present invention is that multiplex operations are carried out with respect to one of the mutually perpendicular coordinates, for example the X-axis, since the cylindrical lens has no image forming capability in the direction of its axis, and also multiplex function is carried out with respect to the second mutually perpendicular direction, which is to say the Y-axis, on the basis of the characteristic of coherent or holographic optical correlation, by varying the incident angle of the reference light for each row of the pattern. In other words, although all of the rows are simultaneously transmitted with a single column, the several patterns of the several rows are effectively separated from each other by the several sets of patterns memorized or stored in the matched filter means of the invention to achieve the arrangement shown in FIG. 4 (*b*), as described above.

IV. Because of the above characteristics set forth in connection with (III), during fluent reading of input patterns a plurality of rows of input patterns are simultaneously identified. Therefore, in contrast with conventional OCR or light filtering techniques, where it is possible only to read one pattern or character at a time, the multiplex system according to the invention is highly advantageous in that it simultaneously carries out identification of several input patterns during fluent reading.

V. The technique which makes possible this simultaneous reading of a plurality of rows, as pointed out above, is the separation of the correlation images in the detection output plane as described above in connection with FIG. 4 (*b*). Because of the position of each pattern during production of the holographic light memory device formed by the matched filter means of the invention, utilizing an incident angle of reference light which is different for each row, the positions of the self-correlation images are separated with respect to each pattern and with respect to each row.

VI. In general, the intensity of the self-correlation image at the detection output plane $P_2$ will vary with the amount of light passing through a particular input pattern. Inasmuch as there are cases where the mutual correlation intensity of one pattern and another pattern may be greater than its self-correlation image intensity, the passing-through light amount of each pattern is separately detected and normalization of the self-correlation image light intensity is produced as referred to above in connection with FIG. 6 (*b*).

Thus, the pattern recognizing system of the present invention will achieve the following object:

1. Identification of a plurality of input patterns applied in sequence for the columns but simultaneously for the rows. In this way it is possible to achieve high-speed pattern recognition.
2. Increase of redundancy of the pattern information and accordingly improvement of discrimination ratio between mutually resembling patterns by parallel simultaneous processing of light filtering outputs of the input pattern in accordance with the X-image and Y-image rectangular coordinate axes.
3. Storing of a pattern group with the matched filter means which is a purely optical memory system in a multiplex arrangement of the particular pattern group in several rows and columns.
4. Simultaneous parallel detection of the patterns by separating the pattern correlation positions according to the light filtering for each row and each column.
5. Detection of the patterns in their normal positions during fluent reading of the input patterns by avoiding overlap of two adjoining or neighboring patterns.
6. Increase of discrimination ratio of recognition by standardizing the input pattern correlation output light intensity for each pattern.

Thus, with the above features the present invention provides a pattern recognizing system which greatly improves the practical functions of a conventional OCR by carrying out simultaneous fluent reading of several pattern rows, optical pattern memorizing instead of conventional electronic computer operations, and increase of pattern information redundancy by the optical arrangement.

Therefore, by giving full play to the two-dimensional simultaneous pattern information processing functions of the optical system, it is possible to carry out in a purely optical manner memorizing of pattern information which is carried out in a conventional OCR by electronic circuits, as well as quantization of patterns and extraction of pattern characteristics which are conventionally carried out in a mechanical or optical manner. For these reasons an electronic computer and scanning operation can be eliminated with the system of the invention, and thus the recognizing system can be of a smaller size and cost than is the case with a conventional OCR.

While with a conventional OCR processing in sequence for each pattern is carried out by the electronic circuitry, the pattern recognizing system of the present invention carries out parallel processing of a plurality of patterns simultaneously so that it is possible to achieve a remarkable increase in the speed of pattern identification, providing a truly high-speed pattern identification operation.

What is claimed is:

1. In a system for recognizing patterns arranged horizontally in rows and vertically in columns with all of said rows respectively forming elements of a given input group and all of said columns respectively forming elements of a given input group so that said rows of patterns and said columns of patterns respectively form a pair of input groups, image-transmitting means for transmitting simultaneously all of the elements of one of said groups and sequentially the elements of the other of said groups, matched filter means positioned with respect to and coacting with said image-transmitting means for receiving the images transmitted thereby and for situating in an output plane correlation images of all of the patterns which are to be recognized in multiplex form according to which a plurality of sets of correlating images of all of the patterns are respectively arranged at different locations at said output plane with the number of said sets corresponding to the number of elements in said one group and said matched filter means cooperating with said image-transmitting means for separating the simultaneously transmitted images of said one input group of patterns respectively among said sets according to the location of the elements of said one input group in the latter while simultaneously providing for each pattern a corresponding pattern image in each set, so that said matched filter means will respond simultaneously to all of the elements of said one input group and sequentially to the elements of said other input group, photosensitive means situated at said output plane for receiving correlation image signals in said output plane simultaneously from said sets and for transmitting simultaneously signals from all of said sets indicating which image of each set matches a given input pattern, and identifying-circuit means electrically connected with said photosensitive means for identifying the signals transmitted thereby so as to be capable of simultaneously reading all of the elements of said one input pattern group while successively identifying the elements of the other pattern group, said image-transmitting means including a pair of optical systems for respectively transmitting images of pattern characteristics with respect to a pair of mutually perpendicular coordinates to output planes of said optical systems and said matched filter means including a pair of matched filter units respectively coacting with said optical systems for situating said plurality of sets of correlation images at each of said output planes, said photosensitive means transmitting signals from both of said output planes to said identifying-circuit means, and said identifying-circuit means combining the signals according to said mutually perpendicular coordinates for increasing the discrimination ratio, said photosensitive means including a pair of photoelectric arrays respectively situated at said output planes for receiving signals therefrom, each of said arrays having a number of photoelectric elements corresponding to the number of patterns memorized by each matched filter unit for automatically responding to the presence of correlation images at said output planes, said identifying-circuit means including for each array of photoelectric elements two groups of OR gates electrically connected with the photoelectric array and including one group of OR gates corresponding to and equalling in number the number of sets of pattern images at each output plane for respectively providing signals according to the set at which there is a correlation image while the other of said groups of OR gates correspond to and equal in number the number of patterns in each set for respectively providing signals according to the pattern of the correlation image irrespective of the set in which it occurs, and a plurality of groups of AND gates respectively corresponding to said one group of OR gates with the AND gates of each group respectively connected electrically with the OR gate of the group to which it corresponds and with the AND gates of each group being respectively connected to the OR gates of the other group, so that in accordance with the particular AND gate which simultaneously receives signals from one of both groups of OR gates an identifying signal will be provided.

2. The combination of claim 1 and wherein said sets of pattern images transmitted by said matched filter means are respectively differentiated from each other according to different angles of incidence of parallel light rays used during storing of patterns in said matched filter means, with the number of said angles of incidence respectively corresponding to the number of elements of said one group.

3. The combination of claim 1 and wherein a positioning-circuit means coacts with said image-transmitting means and is electrically connected between said photosensitive means and said identifying-circuit means for preventing overlap of signals transmitted to said identifying-circuit means.

4. The combination of claim 1 and wherein an illumination-standardizing circuit means coacts with said image-transmitting means and is electrically connected between said photosensitive means and said identifying-circuit means for standardizing the illumination of the image pattern inputs transmitted by said image-transmitting means and normalizing the signals transmitted to said identifying-circuit means.

5. The combination of claim 1 and wherein said optical systems respectively include cylindrical lenses having mutually perpendicular axes and semitransparent reflectors for simultaneously transmitting pattern images to said lenses.

6. The combination of claim 5 and wherein the pair of optical systems respectively are provided subsequent to said cylindrical lenses with shields one of which is formed with elongated slits extending in one direction and the other of which is formed with elongated slits extending in a direction perpendicular to said one direction, and the shield of each system eliminating therefrom information pertaining to the coordinate of the other system.

7. The combination of claim 1 and wherein said identifying-circuit means includes a further plurality of AND gates receiving signals from the AND gates of both parts of said identifying-circuit means which respectively coact with said pair of photoelectric arrays for providing a final identification of the patterns.

8. The combination of claim 1 and wherein said image-transmitting means includes a mask having an elongated vertical slit for simultaneously transmitting images from all of the rows while transmitting an image of only one of the columns, so that said rows form the elements of said one input group while said columns form the elements of said other input group.

* * * * *